(12) United States Patent
Driesner et al.

(10) Patent No.: US 8,843,836 B2
(45) Date of Patent: Sep. 23, 2014

(54) MODEL DRIVEN CONTENT DEVELOPMENT

(75) Inventors: Robert Driesner, Ludwigshafen (DE); Mohammed Unewisse, Mannheim (DE)

(73) Assignee: SAP AG, Walldorf (DE)

( * ) Notice: Subject to any disclaimer, the term of this patent is extended or adjusted under 35 U.S.C. 154(b) by 650 days.

(21) Appl. No.: 12/635,150

(22) Filed: Dec. 10, 2009

(65) Prior Publication Data

US 2011/0145735 A1 Jun. 16, 2011

(51) Int. Cl.
*G06F 3/00* (2006.01)
*G06Q 10/06* (2012.01)

(52) U.S. Cl.
CPC ..................................... *G06Q 10/06* (2013.01)
USPC ........................................................ 715/762

(58) Field of Classification Search
USPC ......... 715/237, 762, 764, 765, 810, 825, 826; 717/146
See application file for complete search history.

(56) References Cited

U.S. PATENT DOCUMENTS

| | | | | |
|---|---|---|---|---|
| 7,712,016 B2* | 5/2010 | Jones et al. | ................... | 715/200 |
| 2003/0128239 A1* | 7/2003 | Angal et al. | ................... | 345/762 |
| 2008/0320441 A1* | 12/2008 | Ahadian et al. | ................ | 717/108 |
| 2009/0007084 A1* | 1/2009 | Conallen et al. | .............. | 717/146 |
| 2009/0164939 A1* | 6/2009 | Ishimitsu et al. | ............. | 715/805 |
| 2009/0328010 A1* | 12/2009 | Cao et al. | ...................... | 717/139 |

OTHER PUBLICATIONS

Yu, Colin, "Overview of the model-driven development paradigm with patterns", Level: Introductory, Nov. 21, 2006, 10 pages.
Kelly, Kevin E., et al., "Model-driven compound document development", Build compound XML documents in Eclipse, Level: Advanced, Jul. 22, 2005, 15 pages.
"Apache Velocity", From Wikipedia, the free encyclopedia, retrieved on Nov. 22, 2009, 3 pages.
"XML Schema (W3C)", From Wikipedia, the free encyclopedia, retrieved on Nov. 22, 2009, 6 pages.
"XPath", From Wikipedia, the free encyclopedia, retrieved on Nov. 22, 2009, 2 pages.

* cited by examiner

*Primary Examiner* — Rashawn Tillery
(74) *Attorney, Agent, or Firm* — Brake Hughes Bellermann LLP

(57) ABSTRACT

According to one general aspect, an apparatus may include a content creation data base and a content entry interface. The content creation data base may be configured to store created content data, and at least one content creation action definition. The content entry interface configured to determine if a content creation action is valid within the context of a user's operations in the content entry user interface, generate, based at least in part upon an executed content creation action, a dynamically generated user interface configured to facilitate a user's inputting of create content data, acquire user input data via the dynamically generated user interface and generate content data based upon the user input data and the content creation action definition.

20 Claims, 9 Drawing Sheets

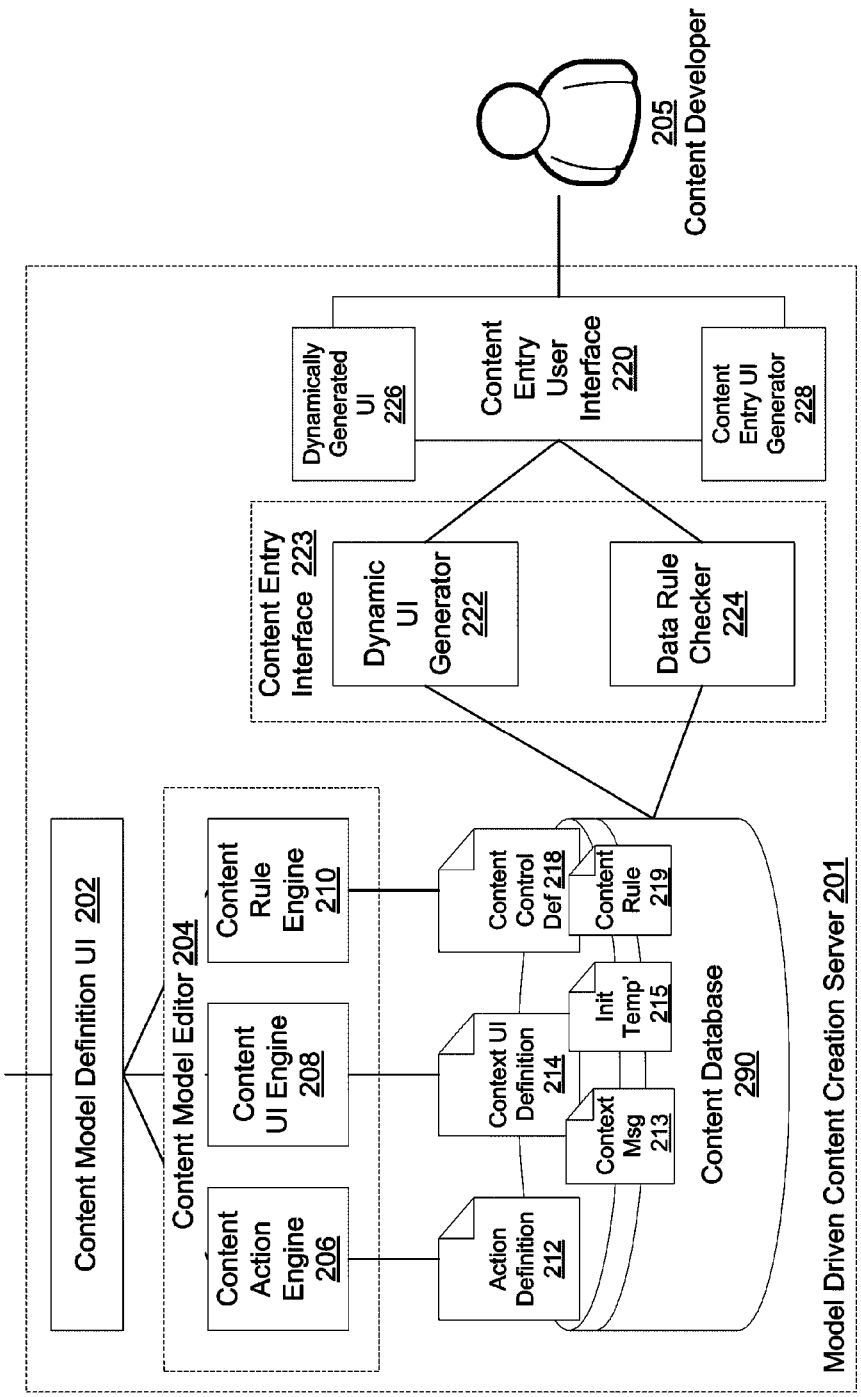

302

304

306

308  BEST AVAILABLE IMAGE

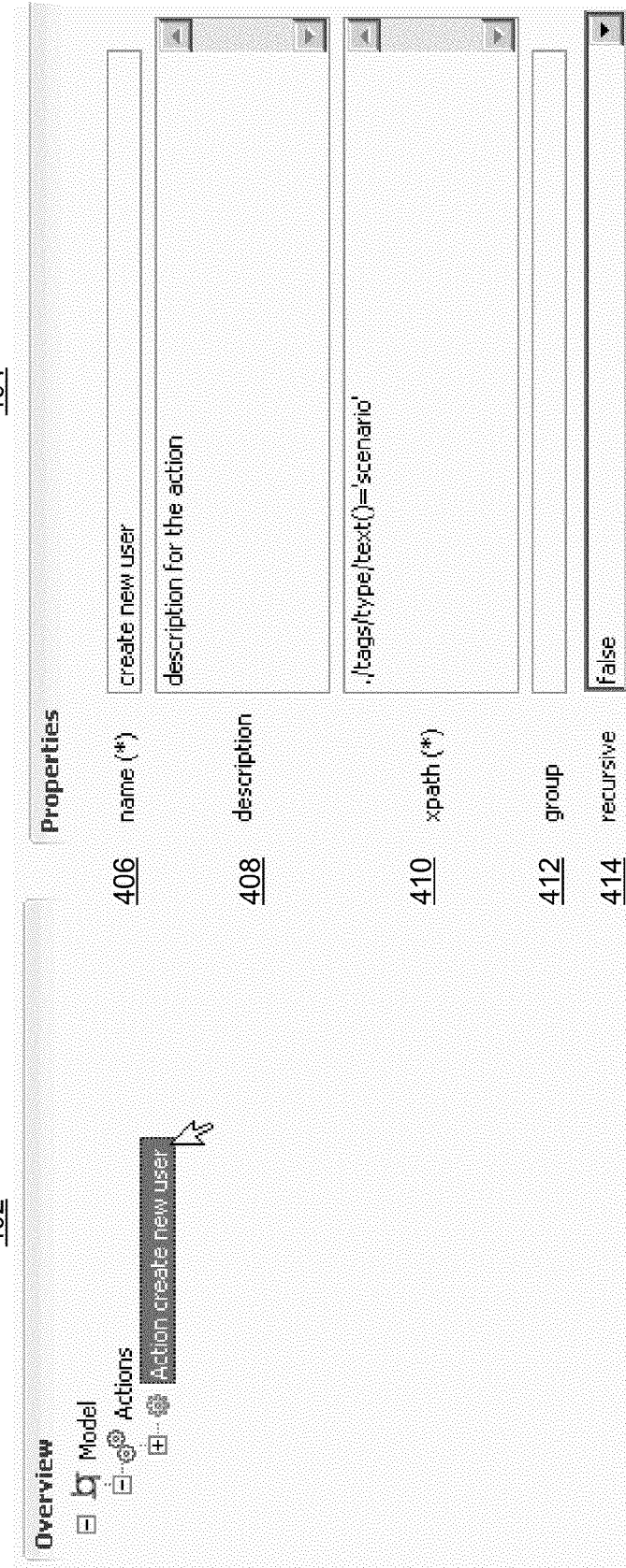

FIG. 5 500

Overview
- Model
  - Actions
    - Action add Groups
      - Message user
      - Control Template model|templates|user|addGroupControl.vm

502

Properties 504

506 name (*) [user]
508 path (*) [schemas/identity.xsd] [Select]

510

```
<?xml version="1.0" encoding="UTF-8"?>
<xsd:schema xmlns:xsd="http://www.w3.org/2001/XMLSchema" xmlns:ctc="http://sap.com/ctc">
    <xsd:element name="Identity">
        <xsd:annotation>
            <xsd:appinfo source="http://www.sap.com/ctc">
                <ctc:message name="Identity"/>
            </xsd:appinfo>
        </xsd:annotation>
        <xsd:complexType>
            <xsd:sequence>
                <xsd:element name="name" type="xsd:string"/>
                <xsd:element name="Groups" type="Groups"/>
            </xsd:sequence>
        </xsd:complexType>
    </xsd:element>
<xsd:complexType name="Groups">
```

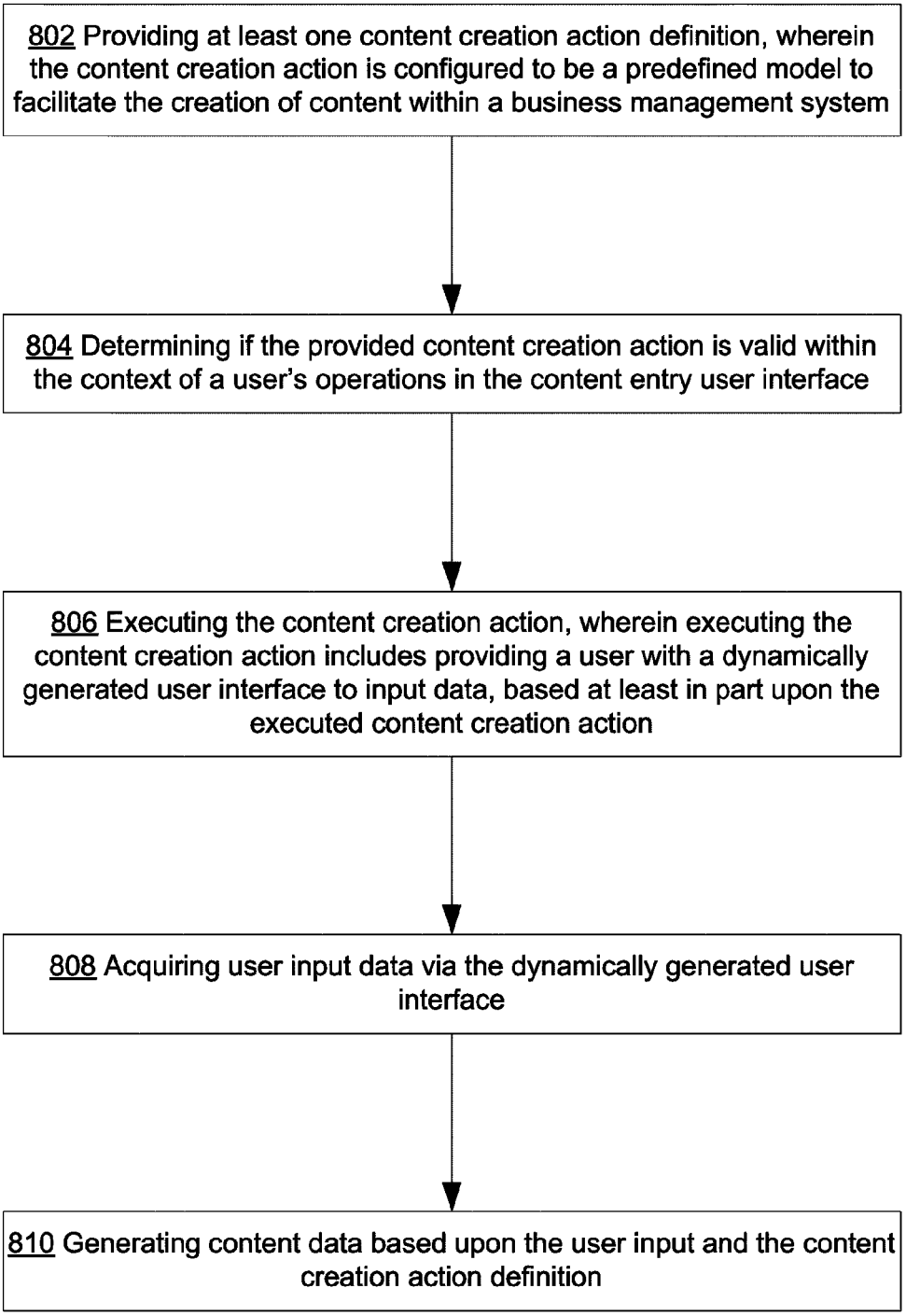

MODEL DRIVEN CONTENT DEVELOPMENT

TECHNICAL FIELD

This description relates to the management of business data, and more specifically to the creation and control of content or information used within a business management system.

BACKGROUND

Enterprise resource planning (ERP) is typically the planning of how business resources (e.g., inventory, employees, customers, etc.) are acquired and flow through the business process associated with each resource. Frequently, ERP includes the capture, storage and analysis of information relating to the tracked resources. In various cases ERP may be divided into sub-categories or systems pertaining to financials, human capital management, materials management, customer relationship management, sales & distribution, and production planning, corporate services, and/or general operations management. In general, a well executed ERP system enhances productivity and provides insight to a business. Often an ERP customer may wish to keep their ERP data secret from their competitors and more generally the world.

Customer relationship management (CRM) is typically the practice of intelligently finding, marketing to, selling to, and servicing customers. Frequently, CRM includes the capture, storage, and analysis of information relating to customers, vendors, partners, and/or internal systems. Often a customer may wish to keep their customer relationship management data secret from their competitors and more generally the world.

Other typical business management activities may include, for example, Supplier Relationship Management (SRM), Product Lifecycle Management (PLM), Supply Chain Management (SCM), etc.

Often to properly utilize these business management systems data or content may be entered into one or more databases. In order to make these business management systems more useful to a particular client a fair amount of customization is often involved in altering the business management system to suit the needs or desires of the client. Part of the customization process typically involves shaping the way data or content may be entered into a database. Another part includes shaping the way tasks are performed within the business management system.

SUMMARY

According to one general aspect, an apparatus may include a content creation data base, a content entry user interface generator, and a content entry interface. The content creation data base may be configured to store created content data, and at least one content creation action definition, wherein the content creation action is includes a predefined model configured to facilitate the creation of created content data within a business management system. The content entry user interface generator may be configured to generate at least a portion of a content entry user interface configured to facilitate the entry and editing of created content data. The content entry interface configured to determine if a content creation action is valid within the context of a user's operations in the content entry user interface, generate, based at least in part upon an executed content creation action, a dynamically generated user interface configured to facilitate a user's inputting of create content data, acquire user input data via the dynamically generated user interface and generate content data based upon the user input data and the content creation action definition.

According to another general aspect, a method of model driven content creation within a content entry user interface may include providing, by a model driven content creation apparatus, at least one content creation action definition, wherein the content creation action is configured to be a predefined model to facilitate the creation of content within a business management system. The method may also include determining if the provided content creation action is valid within the context of a user's operations in the content entry user interface. The method may include executing the content creation action, wherein executing the content creation action includes providing a user with a dynamically generated user interface to input data, based at least in part upon the executed content creation action. The method may include acquiring user input data via the dynamically generated user interface. The method may include generating content data based upon the user input and the content creation action definition.

According to another general aspect, a computer program product for model driven content creation within a content entry user interface, the computer program product being tangibly embodied on a computer-readable medium and including executable code that, when executed, is configured to cause a model driven content creation apparatus to acquire at least one content creation action definition, wherein the content creation action is configured to be a predefined model to facilitate the creation of content within a business management system; determine if the provided content creation action is valid within the context of a user's operations in the content entry user interface; dynamically generate a user interface to input data, based at least in part upon a selected content creation action; acquire user input data via the dynamically generated user interface; and generate content data based upon the user input and the content creation action definition.

The details of one or more implementations are set forth in the accompanying drawings and the description below. Other features will be apparent from the description and drawings, and from the claims.

A system and/or method for creating content, substantially as shown in and/or described in connection with at least one of the figures, as set forth more completely in the claims.

BRIEF DESCRIPTION OF THE DRAWINGS

FIG. 2 is a block diagram of an example embodiment of a system in accordance with the disclosed subject matter.

FIG. 4 is a diagram of an example embodiment of a user interface in accordance with the disclosed subject matter.

FIG. 5 is a diagram of an example embodiment of a user interface and data in accordance with the disclosed subject matter.

FIG. 8 is a flow chart of an example embodiment of a technique in accordance with the disclosed subject matter.

DETAILED DESCRIPTION

Figure 1:
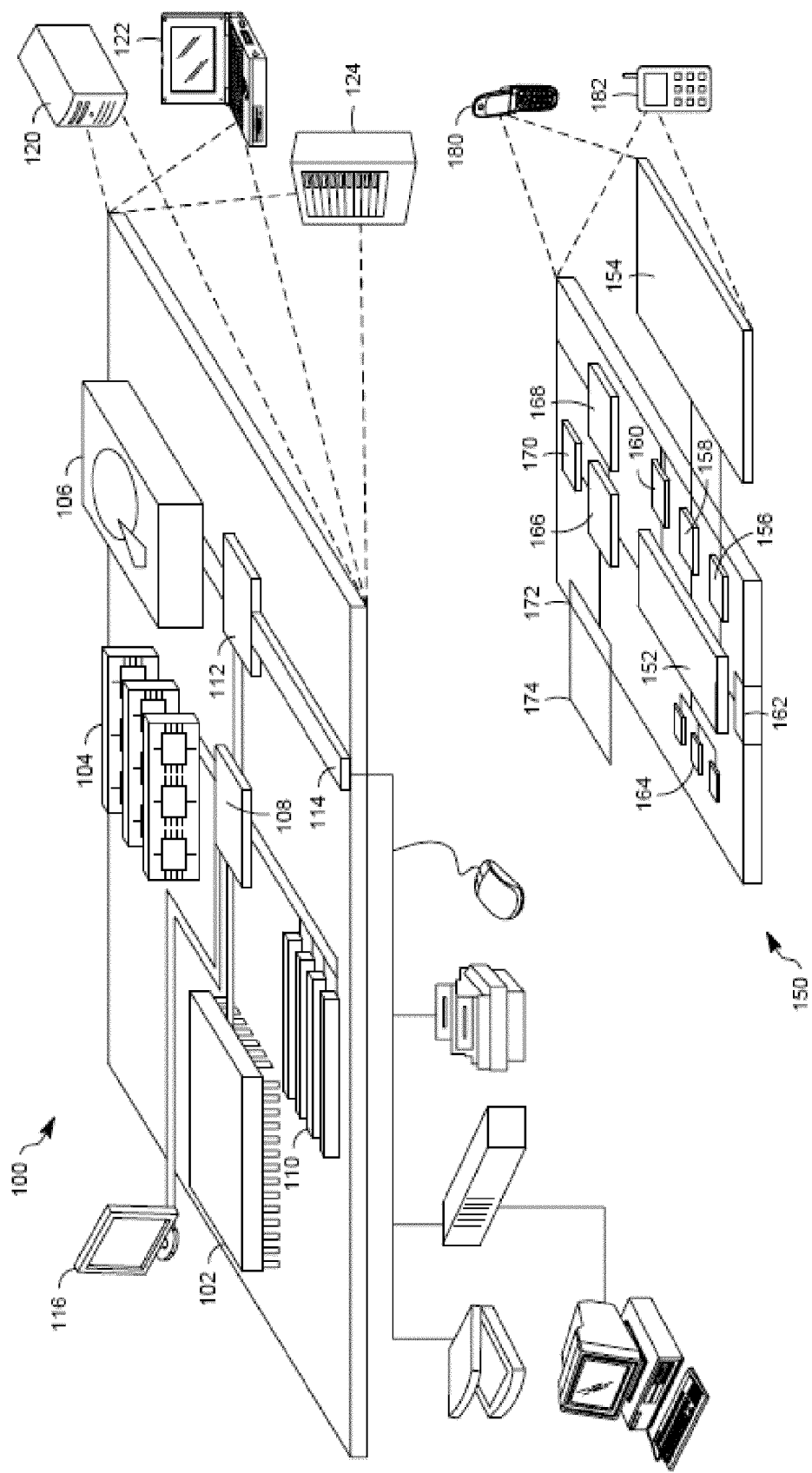
FIG. 1 is a block diagram of an example embodiment of a system in accordance with the disclosed subject matter.

FIG. 2 is a block diagram of an example embodiment of a system 200 in accordance with the disclosed subject matter. In one embodiment, a privileged user or content architect 203 may employ a model driven content creation server 201 to generate a number of content creation models or templates that may, in turn, be used by a user or content developer 205 to create content.

In this context, "content" refers to data stored within a database of a business management system. In various embodiments, the data may include information pertaining to users for the business management system, the business processes related to the business management system (e.g., an inventory flow, customer relationship procedures, etc.), people, places or things (e.g., customers, factories, inventory, etc.) related to the business management system, etc. It is also understood that herein the term "database" may include a plurality of databases.

In one embodiment, the content architect 203 may be responsible for structuring how these various forms of content will be represented within the business management system. Such structuring may include defining which fields (e.g., address, name, quantity, etc.) will be used for each record in the database, defining what types of content (e.g., users, customers, widgets, etc.) will be used in the database, and how the content will be input or entered (in at least one case) in the database, etc.

Conversely, a content developer 205 may be responsible for inputting some or all of the content included within the database. In various embodiments, a content developer 205 may include a normal, common user (e.g., an employee that works in a factory and inputs manufacturing content, etc.). In another embodiment, the content developer 205 may include a user more in-line with a system administrator that manages the configuration of and maintains the business management system. Although, it is understood that the above are merely a few illustrative examples to which the disclosed subject matter is not limited.

A model driven content creation system 201 may, in various embodiments, allow a content architect 203 to enlarge or add capabilities to an Integrated Design Environment (IDE) (e.g., Eclipse, Microsoft's Visual Studio, NetWeaver Developer Studio, etc.) without any knowledge about developing programmatic extensions or plug-ins for an IDE. Traditionally, such programmatic extensions or plug-ins for an IDE have to conform to a specific Application Programmatic Interface (API) specific to the IDE, require expertise regarding computer programming, and pre-compiling source code into executable machine code. This executable machine code is then distributed as a binary extension or plug-in. Wherein, the installation or updating of such a traditional binary executable into an IDE often requires exiting and restarting the IDE.

Conversely, in a model driven content creation system 201 adjustments to the IDE's capabilities may be made dynamically or "on the fly" by a content architect 203 and instantly or near-instantly be made available to a content developer 205, without the need for pre-compilation or distribution of a binary executable. In such an embodiment, the content architect 203 may not need to know any programming language or possess any programming expertise.

The following provides an example general overview of the use of the model driven content creation system 201. It is understood that the following is merely one illustrative example to which the disclosed subject matter is not limited.

In one embodiment, the content architect 203 may identify patterns of configuration content in the content architect's 203 area of expertise or responsibility. In such an embodiment, these patterns may take the form of content creation action definitions (e.g., action definition 212, etc.). In various embodiments, these content creation action definitions may take the form of incomplete but structured data (e.g., an Extensible Markup Language (XML) file, etc.). Such incomplete but structured data may be thought of as a fillable-form or a content document that includes "blank spaces" for a content developer 205 to fill-in.

An analogy may be made between these content creation action definitions or patterns created or identified by the content architect 203 and a form letter. In the form letter shell document, various data (e.g., name, address, etc.) are defined or identified but not given values. Later when the form letter shell is merged with a set of form letter recipients these identified pieces of data are matched with particular values. In the context of this analogy, a content architect 203 may create the form letter shell and the content developer 205 may provide the particular data values to fully complete the creation content.

In order to increase the likelihood that the content developer 205 may input valid data into these patterns or content action definitions, the content architect 203 may also create or define validation rules or content control definitions. When a content developer 205 completes the content actions or "fills-in" the incomplete data in the patterns generated by the content architect 203, the validation rules or content control definitions may be used or employed to confirm that the content developer 205 has entered data in a format or kind that the content architect 203 expects or allows.

Likewise, the content architect 203 may also define a user interface or view that the content developer 205 may use to input the incomplete data based upon the pattern defined in the content action definition. In various embodiments, these views may be defined via a data file that is then interpreted to dynamically generate the view or user interface. In various embodiments, the view of context UI definition data files may include XML files, as described below. In another embodiment, the content architect 203 may also define a user interface or view that allows the content developer 205 to see or observe specific content data (e.g., a view that shows all created users, etc.).

As previously noted in this example, because these content creation actions, context UI or views, and content controls or validation rules are defined in interpreted data files (e.g., XML files, etc.), changes made to these files may be reflected immediately (or when committed or saved by the content architect 203) within the IDE used by the content developer 205. In such an embodiment, these data files may be interpreted by the IDE to dynamically generate the user interfaces, rules, or content actions usable by the content developer 205 without any need to pre-compile an IDE extension or plug-in, or restart the IDE to install or upgrade the generated user interfaces, rules, or content actions. Further, by providing these data files in a standardized format or schema (e.g., a Velocity template, XML, etc.), these data files may be generated by a content architect 203 without requiring that the content architect 203 know or understand a programming language (e.g., C, C#, Java, etc.).

In one embodiment, the model driven content creation system 201 may include one or more of: a content model definition user interface (UI) 202, a content model editor 204, content database 290, and a content entry interface 223. In one embodiment, the content architect 203 may employ the content model definition UI 202, and content model editor 204 to generate or edit a number of content creation action definitions 212, context message or context UI definitions 214, and content control definitions or templates 218. In turn, these definitions 212, 214, and 218 may be employed to create at least a portion of a content entry UI 220 that may be used, in one embodiment, by the content developer 205 to enter or edit the specific content stored within the content database 290. In various embodiments, the content entry UI 220 or portions thereof may be generated by a content entry UI generator 228. In various embodiments, the content database 290 may include one or more databases, individual files (e.g., text files, etc.) or a combination thereof.

In one embodiment, the model driven content creation system 201 may include the content model definition user interface (UI) 202 configured to receive user input regarding the creation and editing of at least one content creation action. In various embodiments, a content creation action may be configured to define an action that may be performed by a content developer or user 205 in order to enter content, via the content entry UI 220 into the content database 290. Throughout this document the specific action of "adding a user to a business management system" is used as an illustrative action; although, it is understood that the above is merely one illustrative example to which the disclosed subject matter is not limited.

Figure 3A:
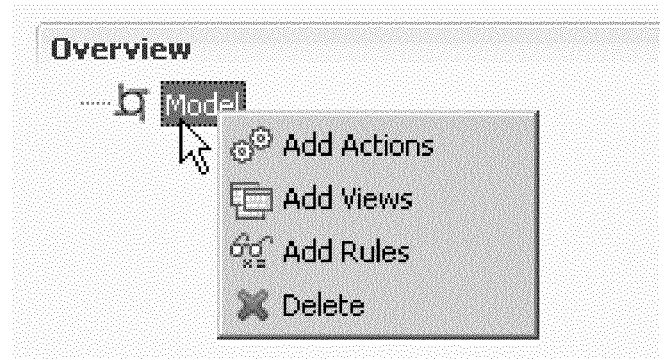
FIG. 3 is a series of diagrams of example embodiments of user interface in accordance with the disclosed subject matter.

FIG. 3a illustrates one example portion of a content model definition user interface (UI) 202. Illustrated is a menu 302 that may be accessed by right-clicking an action within a design environment (e.g., an integrated design environment (IDE), etc.) or other content design editor. In the illustrated embodiment, four options may be selected: add actions, add views, add rules, and delete the selected item which was right-clicked upon. Adding an action may allow for the addition or editing of an action definition 212. Adding a view may allow for the addition or editing of a context UI definition 214. And, adding a rule may allow for the addition or editing of a content rule definition 218. Each of these selections is described in more detail below. It is understood that the above are merely a few illustrative examples to which the disclosed subject matter is not limited.

Returning to FIG. 2. In various embodiments, the content architect 203 may employ the content model definition user interface (UI) 202 to create or edit a content action definition 212. A content action definition 212 may define a content creation action that may be performed by a content developer 205. In one embodiment, the content action definition 212 may include a name or action identifier field configured to identify the content creation action, a description field configured to store user information regarding a description or notes regarding the content creation action, and a visibility condition field configured to store one or more rules that identify under what circumstances the content creation action may be visible to a user.

In various embodiments, a content architect 203 may not wish to allow a content creation action to be available to a content designer 205. For example, there may be no need or desire to burden a content designer 205 with an action that allows for the creation of a new business management system user, if the content designer 205 is using a portion of the content entry UI 220 that deals with, for example, inventory. In such an embodiment, the content architect 203 may establish a set of rules that defines when or in what portion of the content entry UI 220 a particular action is available.

Figure 3B:

FIG. 3b illustrates one example portion of a content entry UI 220. Illustrated is a menu 304 that may be accessed by right-clicking an action within a design environment (e.g., an integrated design environment (IDE), etc.) or other content entry UI 220, if the rules defined in the visibility condition field of the content creation action are met. In the illustrated embodiment, the visible content creation actions are visible under the "CTC Context Actions" sub-menu. In this case, the action "add Groups" is visible as the rules defined in the visibility condition field of that particular content creation action are met, other actions whose visibility conditions are not met are hidden, not visible, or not selectable. Other actions or options not defined by the content creation actions are also shown (e.g., "Export Task Structure") and are not part of this disclosure.

FIG. 4 is a diagram of an example embodiment of a user interface in accordance with the disclosed subject matter. UI 400 illustrates, in one embodiment, a portion of the content model definition UI 202 that may be employed to facilitate entry, creation and/or editing of a content creation action definition 212. Selectable UI 402 illustrates that an action may be a selectable item in a hierarchal list. In the illustrated embodiment, the action is displayed via its name or indicator as stored within the name or indicator field.

The UI 404 illustrates a dialog box of a series of text fields which may be used or employed to define the values of the various fields of the content creation action and its content creation action definition 212. The name or indicator UI elements 406 may be configured to provide a means to edit the name or indicator field, as described above. The description UI elements 408 may be configured to provide a means to edit the description field, as described above.

The visibility UI elements 410 may be configured to provide a means to edit the visibility field, as described above. In one embodiment, the visibility rules may be included within an XPath query value that may be evaluated to "true" or "false". Extensible Markup Language (XML) Path Language (XPath) is a query language for selecting nodes from an XML document. In such an embodiment, the XPath expression may operate on the XML node in the selected file or portion of the content entry UI 220. If the selection is on a folder, then a metadata for the folder, for example a "tags.xml" file inside the folder, may be used for the visibility rules. If there is no metadata file, an empty xml node may be generated and used for the visibility rule or expression. If the visibility rule or expression resolves to a "true" value action will be visible.

The group UI elements 412 may be configured to provide a means to edit the group field included by some embodiments of the content action definition 212. In various embodiments, the group field may be configured to create a structure detailing how the multiple actions should be grouped (e.g., actions for users, actions for inventory, etc.). In some embodiments, to create several levels or a hierarchal structure to the action groups the use of a separator (e.g., "/", ":", etc.) may be employed. For example "Netweaver/Users" would provide a group "Netweaver" containing the group "Users" which contains at least the action "new action". If the group field is empty, the action may be shown in the highest level or a predefined sub-level (e.g., "CTC Content Actions") in the Content Entry UI 220 context UI element (e.g., right-click menu 304 of FIG. 3b).

The recursive UI elements 414 may be configured to provide a means to edit the recursive field included by some embodiments of the content action definition 212. In various embodiments, the recursive field may be configured to allow an action to propagate in the children actions of a group of actions (as defined by the group field). In various embodiments, the default value may be "false".

Returning to FIG. 2, in various embodiments, the content action definition 212 of FIG. 2 may be stored as an XML document or value within a database (e.g., content database 290). Likewise, the values of the fields of the content action definition 212 may be stored within separate XML files. In such a modular embodiment, some fields (e.g., the visibility field) may include a rule set that may be shared amongst multiple content action definitions 212.

In various embodiments, the content model definition UI 202 may be configured to receive input data from a content architect 203 regarding a content action definition 212. The content model editor 204 may include a content action engine 206 configured to receive this content action input data and generate or edit a content action definition 212. Likewise, the content action engine 206 may be configured to read one or more content action definitions 212 and provide the information contained therein to the content model definition UI 202 to be displayed to the content architect 203.

In one embodiment, the content action definition 212 may include or be associated with one or more context UI definitions 214. In one embodiment, a context UI definition 214 may be configured to define, at least partially, a UI 226 that may be dynamically generated by a dynamic UI generator 222 for display via the content entry UI interface 220. In various embodiments, a content entry UI interface 220 may include or be associated with a context message 213 and/or an initialization template 216.

In one embodiment, this context message 213 may result in the dynamic UI generator 222 generating a wizard UI, wherein a wizard UI is a UI configured to lead a user 205 through a number of steps or stages (e.g., inputting data, etc.) via at least one dialog box. In various embodiments, the number of steps or stages and the order thereof may be predefined in the context message 213.

For example, if the content action definition 212 defines an action that facilities the creation of a user to the business management system and the association of the new user to a group of users, the content action definition 212 may be associated with a context message 213 that is configured to dynamically generate a UI 226 with which a user or content developer 205 may input data regarding the added user.

Figure 3C:
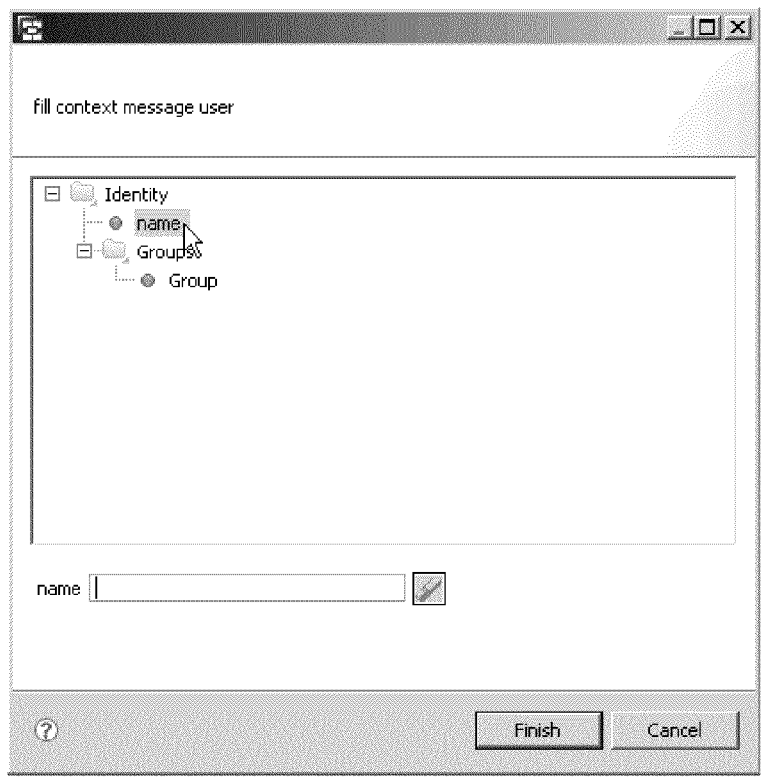
Figure 3D:

FIG. 3c illustrates one example portion of a content entry UI 220. Illustrated is a dialog box 306 that may be dynamically generated in response to an action being selected within a design environment (e.g., an integrated design environment (IDE), etc.) or other content entry UI 220. In the illustrated embodiment, the dynamically generated UI 306 may be configured to receive input data regarding the creation of a user and the association of that user within a group of users. While in the illustrated embodiment the UI 306 is fairly simple, more complex dynamically generated UIs are within the scope of the disclosed subject matter and may include multiple dialog box or screens, and various UI elements. A few such UI elements are illustrated in FIG. 3d and UI elements 308.

FIG. 5 is a diagram of an example embodiment of a user interface in accordance with the disclosed subject matter. UI 500 illustrates, in one embodiment, a portion of the content model definition UI 202 of FIG. 2 that may be employed to facilitate entry, creation and/or editing of a context message 213. Selectable UI 502 illustrates that a context message may be a selectable item in a hierarchal list. In the illustrated embodiment, the context message may be displayed via its name or indicator as stored within the name or indicator field.

UI 504 illustrates that, in one embodiment, a context message 213 may include a name or identifier field (editable via UI elements 506) and a UI definition field (editable via UI elements 508). In such an embodiment, the name or identifier field may include a value used or employed to define the context message. The UI definition field may be configured to either directly include a definition of the UI to be dynamically generated or, as illustrated a path to definition of the UI to be dynamically generated.

In one embodiment, the UI definition may include information arranged in basic predefined schema or format. In various embodiments, this schema may include an XML Schema (XSD) file, as illustrated by the sample portion of the schema file 510. The schema file 510 may include definitions of nodes (e.g., "Identity", "Groups", etc.) or other UI elements, illustrated via the "element" and "annotation" tags. The schema file 510 may also be used to define values for selection. These values may be displayed to the user as a ComboBox or other UI element and the content may be specified with another tag in schema definition. For example, the "restriction" tag may be used to make a restriction on a node or UI element. For example, a UI element may be restricted to only accept the values Christian, Mo or Robert, by default the value Robert may be set. Although, it is understood that the above are merely a few illustrative examples to which the disclosed subject matter is not limited.

Returning to FIG. 2, in various embodiments, the context message 213 may include or make use of one or more template files (e.g., schema file 510). In a specific embodiment, the template file may include a Velocity template file. This is to say, a template file substantially in accordance with the Apache Velocity project definitions. Velocity is a Java-based template engine that provides a simple yet powerful template language to reference objects defined in Java code. In various embodiments, the template file may call up or utilize additional template files, such that the UI definition may be hierarchal and modular. Although, it is understood that the above is merely one illustrative example to which the disclosed subject matter is not limited.

In various embodiments, an initialization template 215 may be configured to provide the content architect 203 with a means to modify UI messages for the UI dynamically generated, by the dynamic UI generator 222, in response to the context message 213. For example, an initialization template 215 may be employed to load values for selection into a node or other UI element. In another embodiment, an initialization template 215 may be configured to add additional UI messages or elements in response to a user or content developer's 205 selections.

In one embodiment, two general types of initialization templates 215 may be employed. The first type of initialization template 215 may be executed during the initial generation of the UI by the dynamic UI generator 222, and may, for example, preload UI elements with selectable options or other data. The second type of initialization template 215 may be executed in order to modify (e.g., add UI elements, dialog boxes, etc.) based upon user or content developer's 205 selections. For example, a content developer 205 may select a value in a wizard page which may trigger the dynamic UI generator 222 to process an initialization template 215, which in turn generates new portions of the dynamically generated UI (e.g., a new wizard page or dialog box, etc.).

Figure 6:
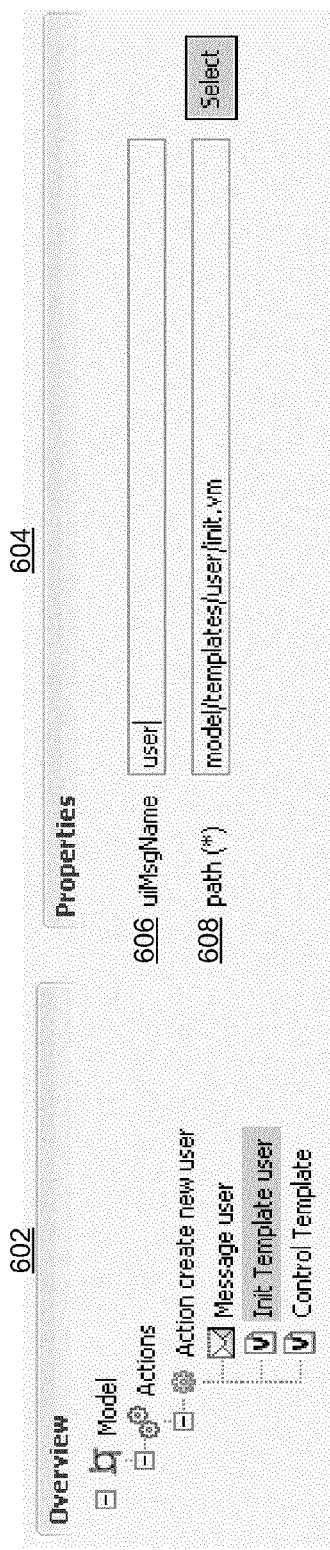
FIG. 6 is a diagram of an example embodiment of a user interface in accordance with the disclosed subject matter.

FIG. 6 is a diagram of an example embodiment of a user interface in accordance with the disclosed subject matter. UI 600 illustrates, in one embodiment, a portion of the content model definition UI 202 of FIG. 2 that may be employed to facilitate entry, creation and/or editing of an initialization template 215. Selectable UI 602 illustrates that an initialization template may be a selectable item in a hierarchal list. In the illustrated embodiment, the initialization template may be displayed via its name or indicator as stored within the name or indicator field.

UI 604 illustrates that, in one embodiment, an initialization template may include a message name or identifier field (editable via UI elements 606) and a template definition field (editable via UI elements 608). In such an embodiment, the message name or identifier field may include a value used or employed to define the UI or context message name or identifier of the wizard page or dynamically generated UI element or screen the initialization template will be executed or run. In various embodiments, without this attribute or a predefined value (e.g., null, empty string, etc.) the initialization template may be configured to execute or run before showing the dynamically generated UI.

The template definition field may be configured to either directly include a definition of the template and values to be generated or, as illustrated a path to definition of the template and values to be generated. Again, in one specific embodiment, the template definition field may include a Velocity compliant template file; although, it is understood that the above is merely one illustrative example to which the disclosed subject matter is not limited.

Template file portion 610 illustrates one embodiment of a template definition or initialization template as defined via the template definition field. It is noted that the template definition need not be an XML file; although such would be within the scope of the disclosed subject matter. The first line of portion 610 shows that a variable, $schemaPath, that may be used in other initialization templates or context UI definitions may be assigned a fixed or predefined value (e.g., a path to a XML Schema file). The second line of portion 610 illustrates that a variable, $elements, may be assigned a value based upon a function or procedure definition (e.g., $xpath.getElements, etc.) that may be computed or executed as the initialization template is executed. For example, the second line may assign an array to $elements that includes all the group names from the current node or UI element. The third line of portion 610 illustrates that, in one embodiment, values computed or assigned previously in the initialization template may be employed to create new values or variables (e.g., $groupNode). The fourth line of portion 610 illustrates that elements may be dynamically added to the dynamically generated UI as defined by a context message.

Template file portion 612 illustrates another embodiment of a template definition or initialization template as defined via the template definition field. The first line of portion 612 illustrates that information may be retrieved based upon a selection made by the user or content developer within the dynamically generated UI (e.g., the selected group shown on a wizard page or screen, etc.). The second and fifth lines of portion 612 show that, based upon, that retrieved value (e.g., $group) conditional decisions may be made. The third and fourth lines of portion 612 illustrate that UI elements (e.g., a new wizard page or screen, etc.) may be added to a dynamically generated UI.

It is understood that the above are merely a few illustrative examples to which the disclosed subject matter is not limited.

Returning to FIG. 2, in various embodiments, the initialization template 215 may include or make use of one or more template files (e.g., template files 610 and 612). In various embodiments, the context UI definition 214, context message 213, and initialization template 215 may be generated or edited by the content architect 203. In various embodiments, the content model definition UI 202 may be configured to receive input data from a content architect 203 regarding the context UI definition 214, context message 213, and/or initialization template 215. The content model editor 204 may include content UI engine 208 configured to receive this content UI input data and generate or edit a context UI definition 214, context message 213, and/or initialization template 215. Likewise, the content UI engine 208 may be configured to read one or more context UI definition 214, context message 213, and/or initialization template 215 and provide the information contained therein to the content model definition UI 202 to be displayed to the content architect 203.

In one embodiment, the content action definition 212 may include or be associated with one or more context control definitions 218. In one embodiment, a context control definition 218 may be configured to define, at least partially, a set of rules that data input via the dynamically generated UI portion of the content entry UI 220 should conform to. In such an embodiment, data input by a user or content developer 205 may be required to or strongly suggested to, in the case in which a violation of a rule merely creates a warning, conform to a certain standard defined by the content control definition 218. In various embodiments, a context control definition 218 may include or be associated with a content rule 219.

In various embodiments, as data is input via the dynamically generated UI 226, the data rule checker 224 may be configured to check the input data against the set or rules defined in by the content control definition 218. In various embodiments, which set of rules or content rule 219 is employed may depend upon the content action associated with the dynamically generated UI 226. In one embodiment, if the input data does not conform to the given standard, as defined by the associated content control definition 218, a remediation action may be performed. In various embodiments, such a remediation action may include rejecting the input data via an error, warning that the input data does not conform to the given standard, placing a marker, via the content entry UI 220, on the resource or content to which the input data pertains, etc. In some embodiments, the form of remediation may be included in the associated content control definition 218. In another embodiment, the form of remediation may be predefined or standardized for the model driven content creation system 201.

Figure 7:
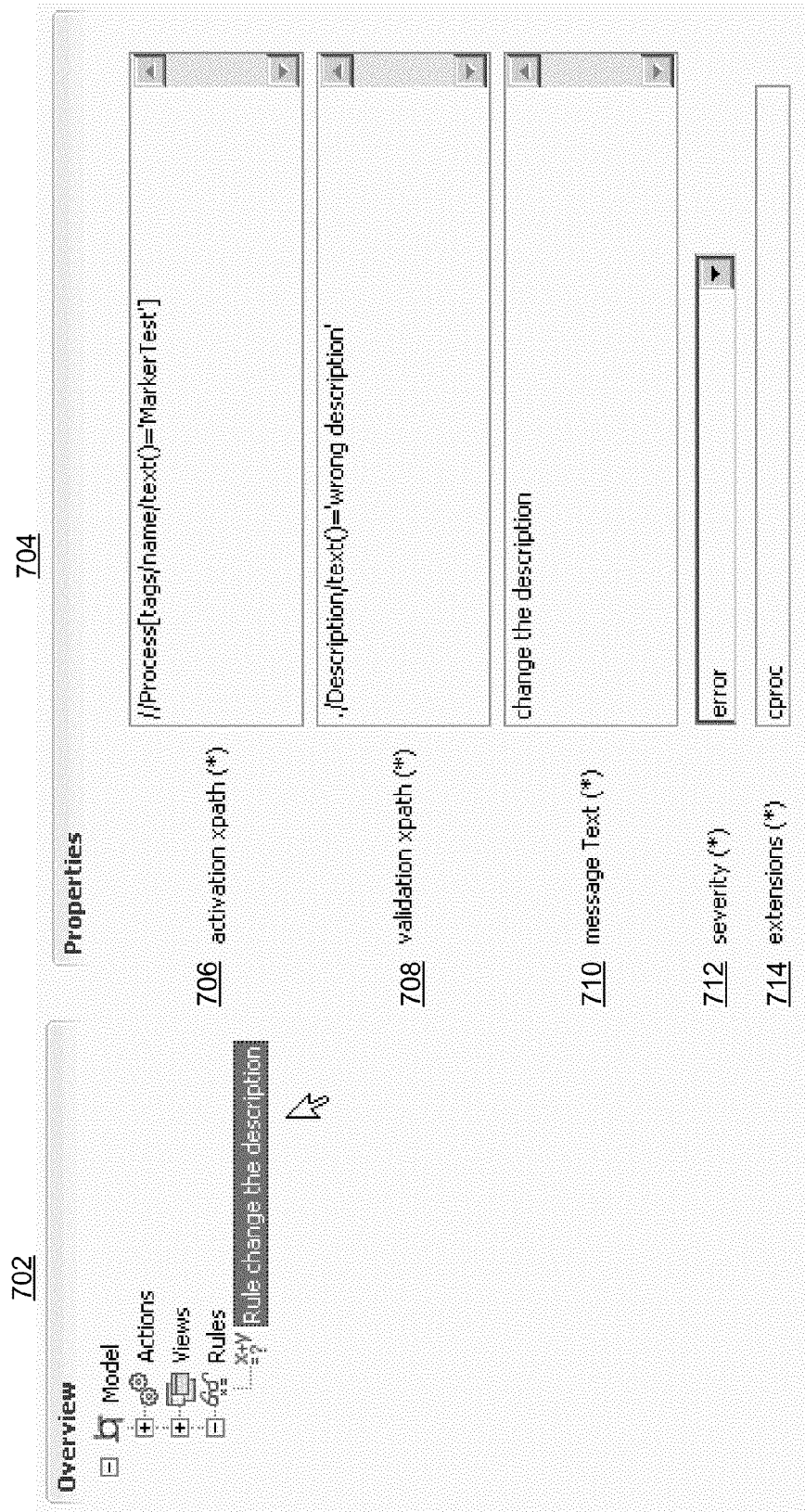
FIG. 7 is a diagram of an example embodiment of a user interface and data in accordance with the disclosed subject matter.

FIG. 7 is a diagram of an example embodiment of a user interface in accordance with the disclosed subject matter. UI 700 illustrates, in one embodiment, a portion of the content model definition UI 202 of FIG. 2 that may be employed to facilitate entry, creation and/or editing of a content control definition 218. Selectable UI 702 illustrates that a content control definition may be a selectable item in a hierarchal list. In the illustrated embodiment, the content control definition may be displayed via its name or indicator as stored within the name or message field.

UI 704 illustrates one embodiment of a UI configured to facilitate entry, creation and/or editing of a content control definition. UI 704 illustrates that, in one embodiment, a content control definition may include an activation field (editable via UI elements 706) configured to define the input data or structured element (e.g., XML tag or element, etc.) this rule or content control should be associated with and applied to. The content control definition may include a validation field (editable via UI elements 708) configured to test or validate the input data. As illustrated by this example the validation field may include an XPath query configured to test a given piece of input data. In another embodiment, the validation field may include a rule in another programming language or a path to a file containing one or more rules (e.g., a content rule, etc.).

The content control definition may include a message field (editable via UI elements 710) configured to include a message or text that may be shown if this rule is activated and/or if the input data does not conform to this rule. The content control definition may include a severity field (editable via UI elements 712) configured to indicate the level of severity of non-compliance with this rule (e.g., error, warning, informational, etc.). The content control definition may include an extensions field (editable via UI elements 714) configured to define file extensions (e.g., *.cproc, *.cwiz, etc.) for files that may be searched for validation. In various embodiments, these files to be searched or associated with the content control definition may include context UI definitions.

Returning to FIG. 2, in various embodiments, the content control definition 218 may include or make use of one or more content rule files 219. In various embodiments, the content control definition 218 and/or content rule 219 may be generated or edited by the content architect 203. In various embodiments, the content model definition UI 202 may be configured to receive input data from a content architect 203 regarding the control definition 218 and/or content rule 219. The content model editor 204 may include content rule engine 210 configured to receive this content control input data and generate or edit a control definition 218 and/or content rule 219. Likewise, the content rule engine 210 may be configured to read one or more control definition 218 and/or content rule 219 and provide the information contained therein to the content model definition UI 202 to be displayed to the content architect 203.

As described above, the model driven content creation server 201 may include a content entry interface 223 and a content entry UI 220. In one embodiment, the content entry UI 220 may be configured to interact with a user or content developer 205 and to facilitate the creation and editing of content used to configure a business management system (not shown). In various embodiments, the content entry UI 220 may be configured to display to include one or more dynamically generated UIs 226. However, in a preferred embodiment, the content entry UI 220 may be configured to generally display or provide a plurality of predefined UI elements that collectively provide the user or content developer 205 with a substantially integrated design environment (IDE) with which to enter and edit configuration data and content pertaining to a business management system (e.g., ERP, CRM, etc.).

In various embodiments, the content entry interface 223 may be configured to provide at least one content creation action definition 212, wherein the content creation action definition 212 is configured to be a predefined model to facilitate the creation of content within a business management system. The content entry interface 223 may also be configured to determine if a content creation action is valid (e.g., via the content creation action definition's 212 visibility field) within the context of a user or content developer's 205 operations within the content entry UI 220.

In one embodiment, the content entry interface 223 may include a dynamic UI generator 222 configured to dynamically generate a UI 226 based, at least in part, upon the content creation action definition 212 or a content UI definition 214 associated with or included by the creation action definition 212. The dynamically generated UI 226 may be configured to provide a means for a user or content developer 205 to input data related to the content creation action.

In one embodiment, the content entry interface 223 may include a data rule checker 224 configured to receive or acquire the input data from or via the dynamically generated UI 226. The data rule checker 224 may be configured to check that the received input data conforms or adheres to a predefined rule or set of rules defined within a content control definition 218 associated with the content creation action or the definition 212 thereof. In various embodiments, the data rule checker 224 may be configured to generate or instruct the content entry UI 220 to display any error messages (e.g., error, warning, informational, etc.) the result due to non-conformance with the predefined rule or set of rules defined within a content control definition 218.

In various embodiments, if no errors forbidding the creation of content data occur, the data rule checker 224 or the content entry interface 223 may be configured to generate content data and store the content data within the content database 290. In some embodiments, this content data may be stored in a predefined structure associated with the content creation action. For example, the content creation action may define an XML template to which the data is to placed (e.g., as a tag value, etc.).

FIG. 8 is a flow chart of an example embodiment of a technique in accordance with the disclosed subject matter. In various embodiments, the technique 800 may be used or produced by the systems such as those of FIG. 1 or 2. Furthermore, portions of technique 800 may be use or produce user interfaces such as those of FIGS. 3, 4, 5, 6, and 7. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, at least one content creation action definition may be provided by a model drive content creation server or stored within a content database. In various embodiments, the content creation action may be configured to be a predefined model to facilitate the creation of content within a business management system, as described above. In some embodiments, providing may include defining an action identifier, a description, and a visibility condition, as described above. In various embodiments, providing may include associating the content creation action definition with at least one context message, at least one initial template, and/or at least one control template, as described above. In various embodiments, one or more of the action(s) illustrated by this Block may be performed by the apparatuses or systems of FIGS. 1 and 2, the content model editor 204 or content database 290 of FIG. 2, as described above.

Block 804 illustrates that, in one embodiment, a determination may be made as to whether or not the provided content creation action is valid within the context of a user's operations in the content entry user interface, as described above. In various embodiments, determining may include resolving a query or visibility condition included within the content creation action or content creation action definition, as described above. In various embodiments, one or more of the action(s) illustrated by this Block may be performed by the apparatuses or systems of FIGS. 1 and 2, the dynamic UI generator 222 of FIG. 2, as described above.

Block 806 illustrates that, in one embodiment, the content creation action may be executed if selected by a user or content developer, as described above. In various embodiments, executing may include providing a user with a dynamically generated user interface to input data, based at least in part upon the executed content creation action, as described above. In various embodiments, executing may include providing, the user with at least one selectable context message name, wherein each context message is defined by a respective content action definition, as described above. Executing may also include, after a content message name is selected, dynamically generating a user interface based upon user interface information that is stored according to a predefined schema and associated with the selected context message name, as described above. Executing may further include generating content data in a predefined structure associated with the context message, as described above.

In some embodiments, executing a content creation action may include populating at least a portion of the dynamically generated user interface based upon an initial template associated with the content creation action, as described above. In various embodiments, executing may include receiving a user interface message from the dynamically generated user interface, as described above. Executing may also include, upon receipt of the user interface message executing a query defined in an initial template associated with the content creation action, as described above. Executing may further include populating at least a portion of the dynamically generated user interface based upon the results of the executed query, as described above.

In some embodiments, executing a content creation action may include dynamically generating the user interface based upon user interface information that is stored according to a predefined schema and associated with the creation action definition, as described above. In various embodiments, the dynamically generated user interface may include a wizard configured to lead the user through a number of stages, via at least one dialog box, in which the number of stages are performed in a certain sequence, and the number of stages may include inputting data via the at least one dialog box, as described above.

In one embodiment, executing a content creation action may include populating at least a portion of the dynamically generated user interface based upon an initial template associated with the content creation action, as described above. In another embodiment, executing may include receiving a user interface message from the dynamically generated user interface, as described above. Executing may also include, upon receipt of the user interface message executing a query defined in an initial template associated with the content creation action, as described above. Executing may also include populating at least a portion of the dynamically generated user interface based upon the results of the executed query, as described above.

In various embodiments, one or more of the action(s) illustrated by this Block may be performed by the apparatuses or systems of FIGS. 1 and 2, the content entry interface 223, the dynamic UI generator 222 and/or the data rule checker 224 of FIG. 2, as described above.

Block 808 illustrates that, in one embodiment, user input data may be acquired via the dynamically generated user interface, as described above. In various embodiments, acquiring may include receiving input data from the user via a dynamically generated user interface. In various embodiments, the user interface may be based upon user interface information that is stored according to a predefined schema, as described above. Acquiring may also include checking the input data according to at least one rule set defined by a control template that is associated with the content creation action, wherein the control template provides a set of rules to which the input data must conform, as described above. Acquiring may further include generating content data in a predefined structure associated with the content creation action, as described above. In various embodiments, one or more of the action(s) illustrated by this Block may be performed by the apparatuses or systems of FIGS. 1 and 2, the content entry interface 223 and/or the data rule checker 224 of FIG. 2, as described above.

Block 810 illustrates that, in one embodiment, content data may be generated based upon the user input and the content creation action definition, as described above. In one embodiment, generating the content data may include generating content data in a predefined structure associated with the content creation action, as described above. In various embodiments, one or more of the action(s) illustrated by this Block may be performed by the apparatuses or systems of FIGS. 1 and 2, the content entry interface 223 and/or the data rule checker 224 of FIG. 2, as described above.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, and an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152 that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. An apparatus comprising:
a memory storing a content database configured to store content creation model data received from a content architect of an Integrated Development Environment (IDE), the content creation model data providing incomplete but structured data that includes at least one content creation action definition, at least one content view definition, and at least one content rule definition,
wherein the content creation action definition includes a definition of a content creation action, to be executed in response to an operation of a content developer of the IDE, that is configured to facilitate the creation of created content data within a business management system, wherein the created content data is a structured, completed instance of the incomplete but structured data; and
a processor to execute a content entry interface configured to:
provide the content developer with a content entry user interface conforming to the at least one content view definition and configured to facilitate the entry and editing of the created content data,
determine if a content creation action is valid within a context of operations of the content developer in the content entry user interface, based on the at least one content rule definition,
generate, based at least in part upon an executed content creation action, a dynamically generated user interface configured to facilitate creation of the created content data based on input received from the content developer by way of the dynamically generated user interface, and
generate the created content data based upon the input and the content creation action definition.

2. The apparatus of claim 1, wherein the content entry interface is configured to: determine, if a visibility condition defined via the content creation action definition is met; and if so, cause the content entry user interface generator to display the content creation action within the content entry user interface.

3. The apparatus of claim 1, wherein the content entry interface is configured to: provide the content developer with at least one selectable context message name, wherein each selectable context message name is defined by a respective content action definition; after a selectable context message name is selected, dynamically generate the user interface based upon user interface information that is stored according to a predefined schema and associated with the selectable context message name; and generate the created content data in a predefined structure associated with the selected context message name.

4. The apparatus of claim 1, wherein the content entry interface includes a data rule checker configured to: receive the input from the content developer via the dynamically generated user interface, wherein the user interface is based upon user interface information that is stored according to a predefined schema; check the input according to at least one rule set defined by a control template that is associated with the content creation action, wherein the control template is based on the at least one rule definition and provides a set of rules to which the input must conform; and if a portion of the input does not conform to the set of rules, generate an error message.

5. The apparatus of claim 1, wherein the content entry interface includes a dynamic user interface generator configured to: populate at least a portion of the dynamically generated user interface based upon an initial template associated with the content creation action.

6. The apparatus of claim 1, wherein the content entry interface includes a dynamic user interface generator configured to: receive a user interface message from the dynamically generated user interface; upon receipt of the user interface message, execute a query defined in an initial template associated with the content creation action; and generate an additional portion of the dynamically generated user interface based upon the results of the query.

7. The apparatus of claim 1, wherein the content entry interface includes a dynamic user interface generator configured to: dynamically generate the user interface based upon user interface information that is stored according to a predefined schema and associated with the creation action definition; and wherein the dynamically generated user interface includes a wizard configured to lead the content developer through a number of stages, via at least one dialog box, in which the number of stages are performed in a certain sequence.

8. The apparatus of claim 1, further including:
a content model editor configured to:
facilitate the definition of the at least one content creation action definition that includes:
an action identifier field configured to identify the content creation action,
a description field configured to store user information regarding the content creation action, and
a visibility condition field configured to store one or more rules that identify under what circumstances the content creation action may be visible to a user; and
facilitate the creation and editing of:
a context user interface definition associated with the content creation action definition, and including at least one context message configured to facilitate generation of the dynamically generated user interface,
an initial template associated with the content creation action definition, and configured to dynamically alter the generated user interface, and
a control template associated with the content creation action definition, and configured to provide a set of rules, based on the at least one rule definition, to which the input data must conform.

9. A method of model driven content creation within a content entry user interface to create content data comprising:
receiving, by a model driven content creation apparatus, content creation model data from a content architect of an Integrated Development Environment (IDE), the content creation model data providing incomplete but structured data that includes at least one content creation action definition, at least one content view definition, and at least one content rule definition, wherein the content creation action definition includes a definition of a content creation action, to be executed in response to an operation of a content developer of the IDE, that facilitates the creation of the content data within a business management system, wherein the created content data is a structured, completed instance of the incomplete but structured data;
determining if the provided content creation action is valid within a context of operations of the content developer in the content entry user interface, based on the at least one content rule definition, wherein the content entry user interface conforms to the at least one content view definition;
executing the content creation action, wherein executing the content creation action includes providing the content developer with a dynamically generated user interface, based at least in part upon the content creation action, and configured to facilitate creation of the created content data based on input received from the content developer by way of the dynamically generated user interface; and
generating the content data based upon the input and the content creation action definition.

10. The method of claim 9, wherein determining if the provided content creation action is valid includes: determining, if a visibility condition defined via the content creation action definition is met; if so, displaying the content creation action; and if not, not displaying the content creation action.

11. The method of claim 9, wherein executing a content creation action includes: providing the content developer with at least one selectable context message name, wherein each selectable context message name is defined by a respective content action definition; after a context message name is selected, dynamically generating the user interface based upon user interface information that is stored according to a predefined schema and associated with the selected context message name; and generating the created content data in a predefined structure associated with the selected context message name.

12. The method of claim 9, wherein the input is received including: receiving input data from the content developer via the dynamically generated user interface, wherein the user interface is based upon user interface information that is stored according to a predefined schema; checking the input data according to at least one rule set defined by a control template is based on the at least one rule definition and that is associated with the content creation action, wherein the control template provides a set of rules to which the input data must conform; and generating the created content data in a predefined structure associated with the content creation action.

13. The method of claim 9, wherein executing a content creation action includes: populating at least a portion of the dynamically generated user interface based upon an initial template associated with the content creation action.

14. The method of claim 9, wherein executing a content creation action includes: receiving a user interface message from the dynamically generated user interface; upon receipt of the user interface message executing a query defined in an initial template associated with the content creation action; and populating at least a portion of the dynamically generated user interface based upon the results of the executed query.

15. The method of claim 9, wherein executing a content creation action includes: dynamically generating the user interface based upon user interface information that is stored according to a predefined schema and associated with the creation action definition; and wherein the dynamically generated user interface includes a wizard configured to lead the content developer through a number of stages, via at least one dialog box, in which the number of stages are performed in a certain sequence, and wherein the number of stages includes inputting data via the at least one dialog box.

16. The method of claim 9, wherein providing at least one content creation action definition includes: defining an action identifier included by the content creation action definition and configured to identify the content creation action; defining a description included by the content creation action definition and configured to store user information regarding the content creation action; defining a visibility condition included by the content creation action definition and configured to store one or more rules that identify under what circumstances the content creation action may be visible to a user; associating the content creation action definition with at least one context message configured to facilitate the dynamic generation of the user interface with which to input data; associating the content creation action definition with at least one initial template configured to dynamically alter the generated user interface; and associating the content creation action definition with at least one control template configured to provide a set of rules to which the input data must conform.

17. A computer program product for model driven content creation within a content entry user interface, the computer program product being tangibly embodied on a non-transitory computer-readable storage medium and including executable code that, when executed, is configured to cause a model driven content creation apparatus to:

acquire content creation model data from a content architect of an Integrated Development Environment (IDE), the content creation model data providing incomplete but structured data that includes at least one content creation action definition, at least one content view definition, and at least one content rule definition, wherein the content creation action definition includes a definition of a content creation action, to be executed in response to an operation of a content developer of the IDE, that facilitates the creation of content data within a business management system, wherein the created content data is a structured, completed instance of the incomplete but structured data;

determine if the provided content creation action is valid within a context of operations of the content developer in the content entry user interface, based on the at least one content rule definition, wherein the content entry user interface conforms to the at least one content view definition;

execute the content creation action, including providing the content developer with a dynamically generated user interface configured to facilitate creation of the created content data based on input received from the content developer by way of the dynamically generated user interface; and generate the created content data based upon the input and the content creation action definition.

18. The computer program product of claim 17, wherein the executable code configured to cause the apparatus to execute a content creation action includes code to: dynamically generate the user interface based upon user interface information that is stored according to a predefined schema and associated with the creation action definition; and wherein the dynamically generated user interface includes a wizard configured to lead the content developer through a number of stages, via at least one dialog box, in which the number of stages are performed in a certain sequence, and wherein the number of stages includes inputting data via the at least one dialog box.

19. The computer program product of claim 17, wherein the executable code configured to cause the apparatus to acquire user input includes code to: receive input data from the content developer via a dynamically generated user interface, wherein the user interface is based upon user interface information that is stored according to a predefined schema; check the input data according to at least one rule set defined by a control template that is associated with the content creation action, wherein the control template is based on the at least one rule definition and provides a set of rules to which the input data must conform; and if a portion of the input data does not conform to the set of rules, generate an error message.

20. The computer program product of claim 17, wherein the content creation action definition includes: an association with at least one context message configured to facilitate the dynamic generation of the user interface with which to receive the input; an association with at least one initial template configured to dynamically alter the generated user interface; and an association with at least one control template that is based on the at least one rule definition and configured to provide a set of rules to which the input must conform.

\* \* \* \* \*